United States Patent [19]

Squires et al.

[11] Patent Number: 5,477,401

[45] Date of Patent: Dec. 19, 1995

[54] MAGNET SHIELD FOR DISK DRIVE

[75] Inventors: John P. Squires; Steven R. Speckmann; Frederick M. Stefansky, all of Boulder; Kurt M. Anderson; Wallis A. Dague, both of Louisville, all of Colo.

[73] Assignee: Conner Peripherals, Inc., San Jose, Calif.

[21] Appl. No.: 71,372

[22] Filed: Jun. 2, 1993

Related U.S. Application Data

[60] Continuation of Ser. No. 707,457, May 30, 1991, abandoned, which is a division of Ser. No. 431,575, Nov. 3, 1989, Pat. No. 5,223,993.

[51] Int. Cl.[6] .................................................. G11B 5/54
[52] U.S. Cl. .................... 360/75; 360/78.12; 360/97.02
[58] Field of Search ........................... 360/77.05, 78.12, 360/97.02, 97.03, 98.01, 106, 75, 105; 310/12–14, 156; 318/135

[56] References Cited

U.S. PATENT DOCUMENTS

| | | | |
|---|---|---|---|
| 4,439,699 | 3/1984 | Brende et al. | 310/13 |
| 4,471,395 | 9/1984 | Beck et al. | 360/97.03 |
| 4,700,246 | 10/1987 | Luoma et al. | 360/78.12 |
| 4,783,705 | 11/1988 | Moon et al. | 360/78.12 |
| 4,792,712 | 12/1988 | Stokes | 310/156 |
| 4,819,104 | 4/1989 | Dierkes et al. | 360/98.01 |
| 4,979,062 | 12/1990 | Stefansky et al. | 360/97.02 |
| 5,016,131 | 5/1991 | Riggle et al. | 360/106 |

*Primary Examiner*—Roy N. Envall, Jr.
*Assistant Examiner*—Steven R. Garland
*Attorney, Agent, or Firm*—Fliesler, Dubb, Meyer & Lovejoy

[57] ABSTRACT

An apparatus for a disk drive having at least one disk mounted in a housing having a controlled environment defined by the housing. Such a disk drive generally includes, within the controlled environment, one or more transducers for reading information from and writing information to the disk, and at least one actuator for selectively positioning the transducers with respect to the disks. Each actuator includes at least one magnet for providing a magnetic field and an actuator coil, mounted on the actuator, arranged so that a current in said coil creates a force to pivot the actuator. The apparatus comprises a magnet shield encasing each such magnet for preventing matter, generated during the decomposition of said magnet over a period of time, from interfering with the operation of the disk drive.

10 Claims, 11 Drawing Sheets

MAGNET SHIELD FOR DISK DRIVE

This application is a File Wrapper Continuation of Ser. No. 07/707,457, filed May 30, 1991, now abandoned, which is a continuation of application Ser. No. 07/431,575, now U.S. Pat. No. 5,223,993, filed Nov. 3, 1989, naming John P. Squires, Glade N. Bagnell, Charles M. Sander, and Kurt M. Anderson as inventors.

CROSS-REFERENCE TO RELATED APPLICATIONS

DISK DRIVE SYSTEM CONTROLLER ARCHITECTURE, U.S. Pat. No. 4,979,056, issued Dec. 18, 1990, assigned to the assignee of the present application;

DISK DRIVE SOFTWARE SYSTEM ARCHITECTURE, Ser. No. 07/790,008, filed Nov. 4, 1991, now abandoned, which is a file wrapper continuation of Ser. No. 07/488,386, filed Feb. 23, 1990, which is a continuation of Ser. No. 07/057,806, filed Jun. 2, 1987, assigned to the assignee of the present application;

LOW-POWER, HARD DISK DRIVE SYSTEM ARCHITECTURE, Ser. No. 07/564,693, filed Aug. 7, 1990, now abandoned, which is a continuation of Ser. No. 07/152,069, filed Feb. 4, 1987, assigned to the assignee of the present application;

MAGNETIC PARKING DEVICE FOR DISK DRIVE, Ser. 07/909,149, filed Jul. 6, 1992, now abandoned, which is a filed wrapper continuation of Ser. No. 07/643,703, filed Jan. 22, 1991, which is a continuation of Ser. No. 07/269,873, filed Nov. 10, 1988, assigned to the assignee of the present application; and DISK DRIVE SYSTEM USING MULTIPLE EMBEDDED QUADRATURE SERVO FIELDS, Ser. No. 07/860,299, filed Mar. 27, 1992, now abandoned which is a file wrapper continuation of Ser. No. 07/780,443, filed Oct. 17, 1991, which is a file wrapper continuation of Ser. No. 07/386,504, filed Jul. 27, 1989, assigned to the assignee of the present application;

Each of these Related Applications is hereby incorporated by reference.

BACKGROUND OF THE INVENTION

1. Field of the Invention

The present invention relates to disk drives; more particularly, to high performance disk drives having multiple actuators.

2. Description of the Related Art

Conventional disk drives for use in work stations, personal computers, portable computers, and lap top computers, utilize a single actuator to position a single head with respect to each disk surface. Such disk drives often incorporate a plurality of disks organized in a stack, and a plurality of heads associated with corresponding ones of the disk surfaces. All of the heads are supported and positioned by the single actuator. During operation, only a single head reads or writes information from or to each disk surface.

Greater demands are being placed on disk drives by (1) the use of multi-user and/or multi-tasking operating systems, (2) work stations which provide an operating environment requiring the transfer of large amounts of data to and from a hard disk and/or large numbers of disk accesses to support large application programs or multiple users, and (3) the continuing trend toward higher performance microprocessors. The demands on disk drives include higher data transfer rates along with greater access to data.

To satisfy these demands, it has become desirable to increase the performance of hard disk drives beyond the performance levels which can be achieved by reducing access times of single actuator disk drives. (The access time of a disk drive is conventionally known as the average seek time determined by dividing the total time required to seek between all possible ordered pairs of track addressed by the total number of ordered pairs addressed.) Although access times are one factor which determines drive performance, other factors, including the data transfer rate (both to and from the media and to and from the internal buffer of a disk drive), the overhead imposed by the electronics of the disk drive, and the average latency time, all effect the performance of a disk drive.

Conventional disk drives having a single actuator provide performance levels limited by the following factors: (1) Only one track on any one data surface can be accessed at a given time; as a corollary, considering all of the heads, only one cylinder can be accessed at a given time (a cylinder is a vertically oriented segment representing the same track on the surfaces of all of the disks). (2) It is difficult, if not impossible, to simultaneously operate any two heads mounted on a single actuator. (3) In a multi-user or multi-tasking environment one process which is a disk intensive activity substantially reduces the ability of any other process to access data.

One conventional approach to enhancing access to data is to construct a disk drive using the so-called "head-per-track" approach, where one head is dedicated to each track on each disk surface. This approach is not practical for the large track densities (on the order of 1,000 or more tracks per inch) where thousands of heads would be required for each disk surface. In the environment of a work station, personal computer, or portable computer, the electronics required to operate such a large number of heads and the space required for the structural components necessary to support these heads would make it unfeasible to employ the head-per-track approach.

Another conventional approach to enhancing access to data divides the cylinders into multiple zones and utilizes multiple actuators and multiple heads per surface. For a given surface, each actuator positions one head only with respect to one of the multiple zones. One example of this approach is illustrated in U.S. Pat. No. 4,577,240. The multi-zone approach is equivalent to providing two separate logical disk drives which can not access each other's data, and does not enhance performance for any one zone of the disk drive.

The multi-zone approach is dictated in part by the use of actuators which support multiple heads in a vertical line which defines a cylinder, each head being associated with a corresponding one of the data surfaces of the disk drive. Because it is generally faster to electronically switch the head which is active than to perform a seek to a new track, the storage area of a disk drive is filled by cylinder. During the recording process, the actuator positions the heads at a selected cylinder and all of the tracks associated with the selected cylinder are filled with data by performing head switches. Then, a seek is performed and data is recorded in the next selected cylinder. The track densities currently in use are such that two sets of heads can not be aligned to have all heads on track for all tracks in a cylinder. This mechanical misalignment presents the same problems as mechanical off-tracking in a single actuator disk drive. Accordingly, a cylinder formatted by one group of heads can not be efficiently used by another group of heads.

A variation on the multiple zone approach is disclosed in the U.S. Pat. Nos. 4,318,145, 4,331,990, and 4,423,448. These patents disclose disk drives having multiple actuator modules, each actuator module having multiple actuators. The actuator modules are arranged so that the head supported and positioned by each actuator primarily services a selected group of tracks and services a second group of tracks as a backup. Any particular track is capable of being serviced by at least two heads. The back-up feature is used in the event that the primary head is inoperative, or to optimize data access by utilizing the back-up head to service some of the tracks which the primary head is intended to service while the primary head is occupied reading data from other tracks. The lack of positioning control between the actuators in the various actuator modules and the imprecise positioning of the heads provided by the linear actuators utilized in this approach makes it difficult if not impossible to provide a high data density or a high performance disk drive suitable for the environment of a work station, personal computer, portable computer, or lap top computer.

SUMMARY OF THE INVENTION

The invention comprises an apparatus for a disk drive. The disk drive generally includes a housing, storage means for storing data, interactive means for reading information from and writing information on the storage means, actuator means for selectively positioning the interactive means with respect to the storage means, and control means for generating control signals to control said actuator and for providing information signals to and from the interactive means. The apparatus of the invention comprises protective means for isolating the magnet from the storage means. In one embodiment, such protective means may include a magnet shield encasing said magnet and providing a controlled environment thereabout.

DESCRIPTION OF THE PREFERRED EMBODIMENTS

A multiple actuator disk drive according to the present invention will be described with reference to FIGS. 1–14. The disk drive described herein includes, for example, five (5) hard disks with a magnetic coating, utilizes Winchester technology, and two heads per disk surface (four heads per disk); however, the disk drive may utilize various numbers of disks, various numbers of heads per disk surface, and other types of disks, for example, optical disks, and other read/write technologies, for example, lasers.

The form factor selected for the disk drive of the present invention is a half-height, five and one-quarter inch (5¼") form factor in which the length of the disk drive is approximately 8", the width is approximately 5.75", and the height is approximately 1.625". The disks utilized in the disk drive of the present invention have a diameter on the order of 3.75 inches, so-called "3½" inch" disks. The 3½" disks provide the physical space necessary for multiple actuators in a 5¼" form factor disk drive; however, the disk drive of the present invention can be used with disks having diameters larger or smaller than 3.75 inches, and form factors other than 5¼". For example, a 3½" form factor multiple actuator disk drive in accordance with the present invention may be constructed using disks having a diameter of approximately 2½".

Figure 1:
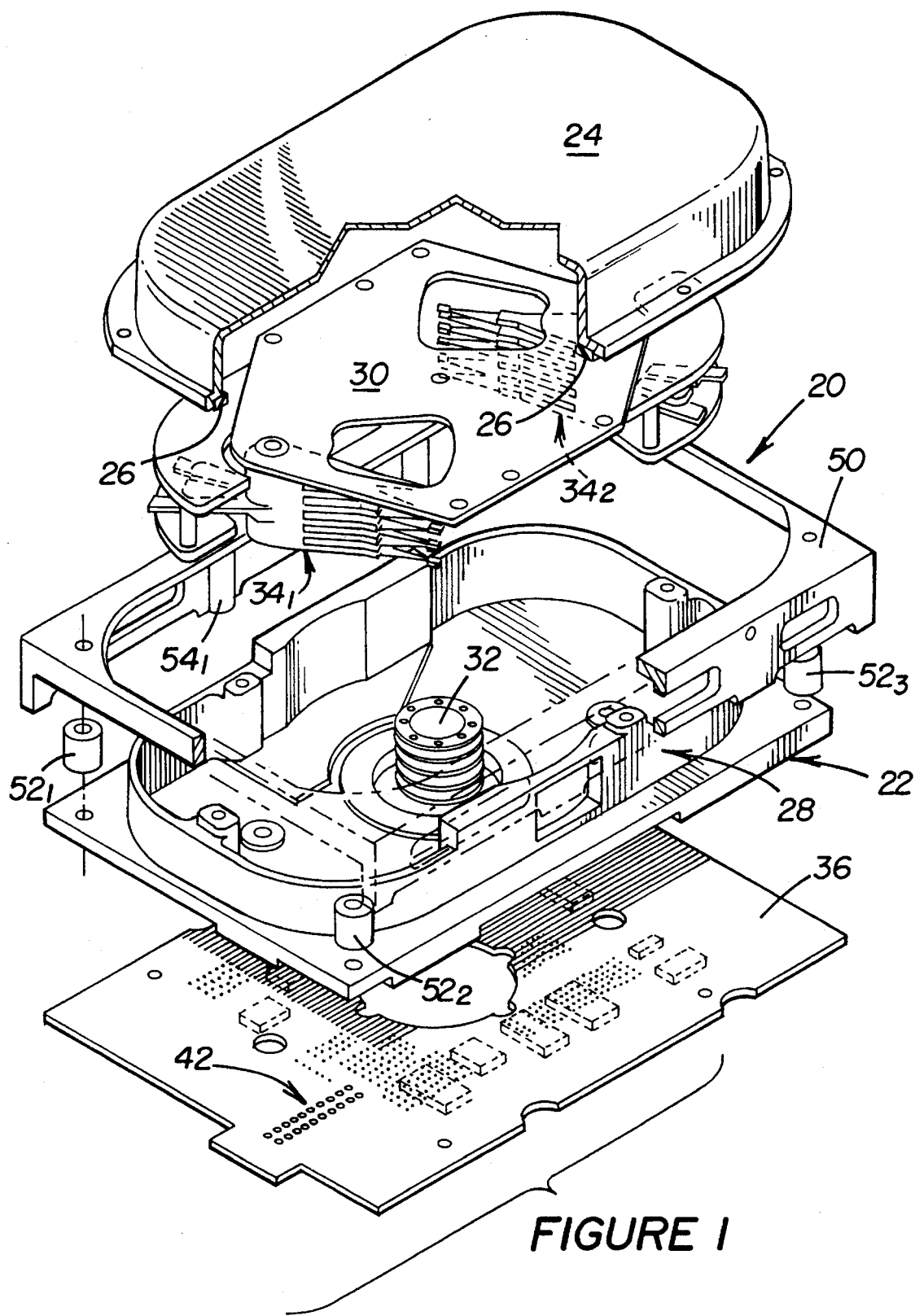
FIG. 1 is an exploded, isometric view of a multiple actuator disk drive in accordance with the present invention.
Figure 2:
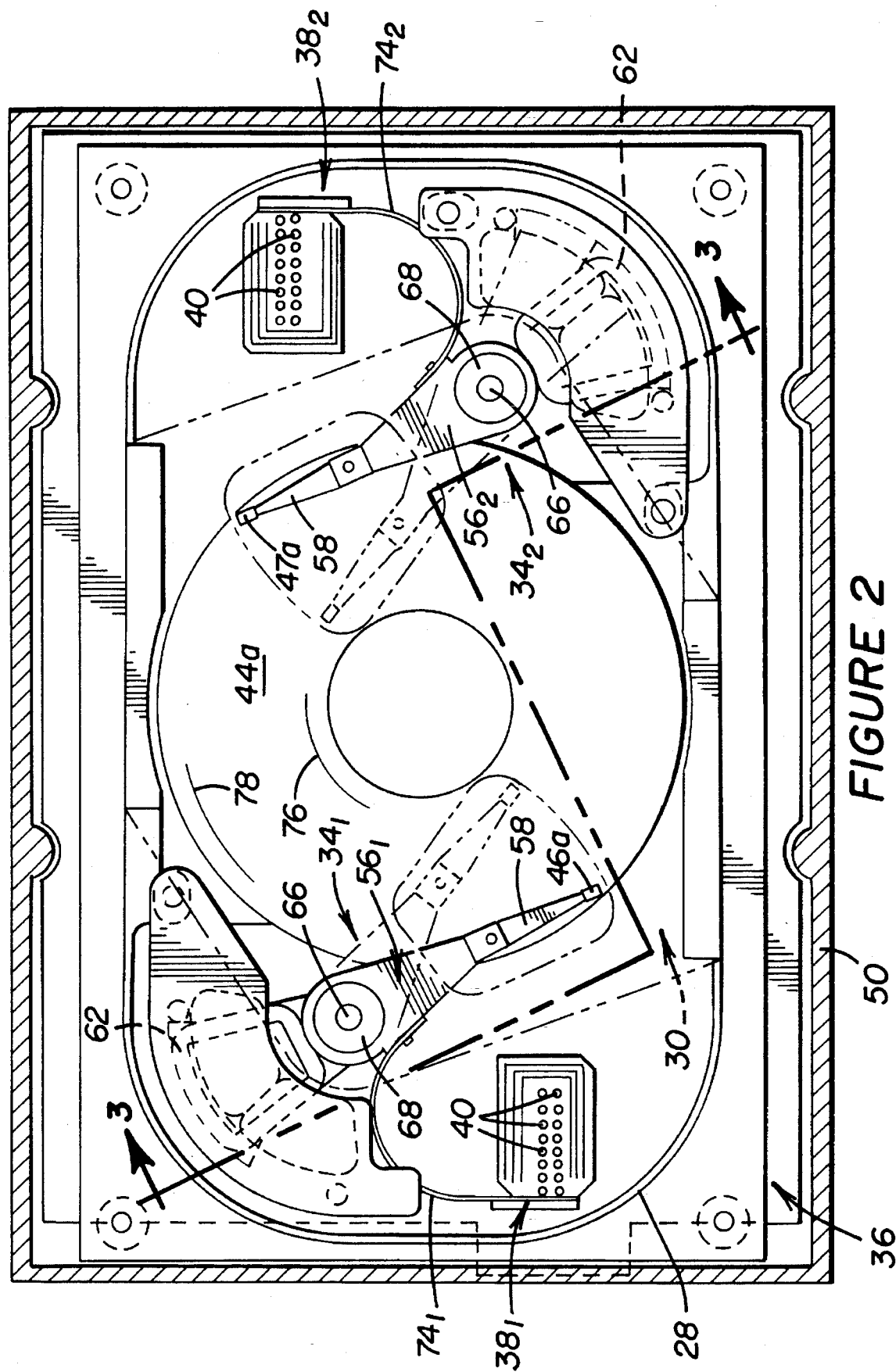
FIG. 2 is a plan view of a multiple actuator disk drive in accordance with the present invention.
Figure 3:
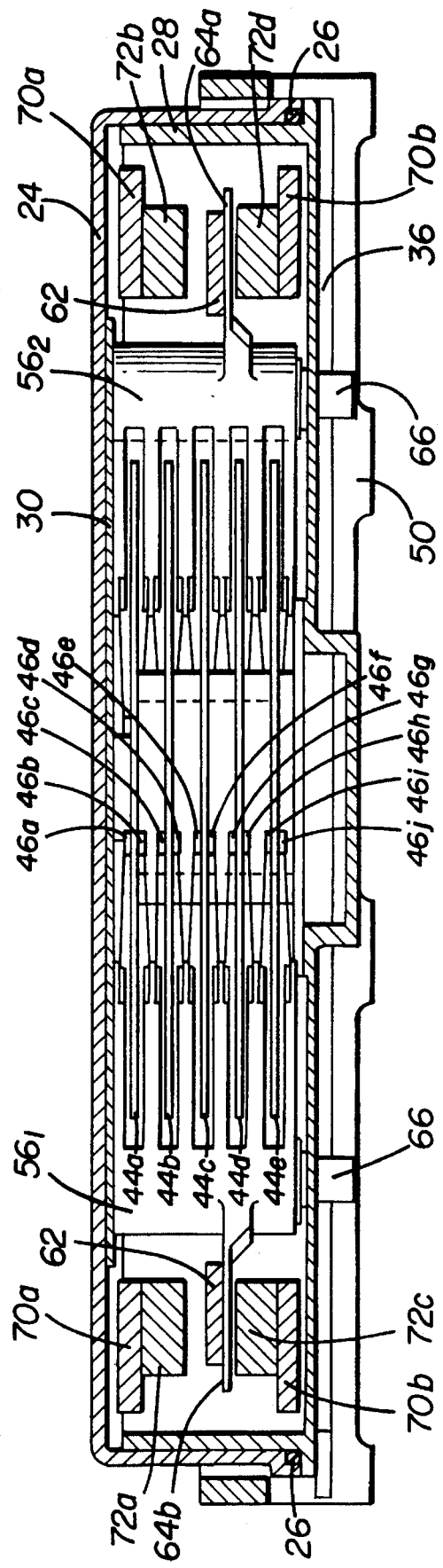
FIG. 3 is a cross-sectional view, along line 3—3 in FIG. 2.

With reference to FIGS. 1–3, a disk drive 20 in accordance with the present invention includes a base 22 and a cover 24. A gasket 26 is provided between base 22 and cover 24 to establish a sealed (or controlled) environment between base 22 and cover 24. Disk drive 20 does not utilize a breather filter, and the seal provided by gasket 26 isolates the sealed environment from ambient atmospheric conditions. The seal provided by gasket 26 is stable at pressures experienced at altitudes from 200 feet below sea level to 10,000 feet above sea level during operation of the disk drive. An internal air filter (not shown) having a 0.3 micron filter is provided in the internal air flow to maintain a clean environment.

Base 22 has a peripheral side wall 28 which is perpendicular to the plane of base 22. Side wall 28 enhances the structural rigidity of base 22 and serves as a support for top plate 30. A spin motor 32, which supports and rotates disks 44a–e, and first and second actuators 34$_1$, 34$_2$ are mounted on base 22. Top plate 30 maintains the relative positions of the rotational axes of spin motor 32 and first and second actuators 34$_{1-2}$. Base 22 and cover 24, along with the components contained therein, comprise a head-disk assembly (HDA).

Disk drive 20 comprises the HDA along with a printed circuit board 36 and a shock frame 50. Printed circuit board (PCB) 36 has circuitry for operating the disk drive; in particular, the circuits provided on PCB 36 create control signals which control the operation of spin motor 32, first and second actuators 34$_{1-2}$, and which handle the transfer of data to and from disks 44a–e. PCB 36 is mounted to base 22 and grounded to the HDA. First and second header assemblies $38_{1-2}$, each comprising a plurality of holes in base 22 and a corresponding plurality of pins 40 potted (sealed) in the holes in base 22, transfer control signals from PCB 36 to the controlled environment between base 22 and cover 24. Pins 40 plug directly into rear-entry connectors $42_{1-2}$ on PCB 36.

Shock frame 50 and base 22 are attached by shock mounts $52_{1-4}$. Screws (not shown) threaded into bosses $54_{1-4}$ of shock frame 50 attach the disk drive 20 to a host computer (not shown) or other supporting structure. Shock frame 50 encompasses the HDA and PCB 36 and has dimensions which provide the overall half height 5¼" form factor package size.

The above-described basic structure of disk drive 20 provides excellent protection from shock and vibration. In particular, disk drive 20 will withstand nonoperating shocks of 50 g's and operating shocks, without nonrecoverable errors, of 10 g's. Nonoperating vibration of 1.0 g's in the range of 5–500 Hz is the specified tolerable limit. Operating vibration, without nonrecoverable data, is specified at 0.5 g's for the range of 5–500 Hz.

As shown in FIGS. 2 and 3, the components in the controlled environment include five disks 44a–e (each having two data surfaces), and two groups of transducers (or heads) 46, 47, each group including ten transducers 46a–j, 47a–j. The first group of transducers 46 are supported and positioned by first actuator assembly $34_1$, and the second group of transducers 47 are supported and positioned by second actuator assembly $34_2$. One transducer from each of the first and second groups of transducers 46, 47 write data on and read data and servo information from corresponding, respective ones of first and second surfaces of each of disks 44a–e. Because disk drive 20 utilizes embedded servo information it is not necessary to provide a data surface having dedicated servo information. Further, providing two transducers per data surface doubles the data transfer rate with respect to single actuator disk drives.

First and second actuator assemblies $34_{1-2}$ perform the function of positioning respective groups of heads 46, 47 with respect to disks 44a–e. Actuator assemblies $34_{1-2}$ are positioned so that they are 180° apart with respect to disks 44a–e. Further, the skew angles for each of the actuator assemblies $34_{1-2}$ are matched as closely as possible so that each group of heads 46, 47 will have the same relative position with respect to each data track. Heads 46a–j and 47a–j may be, for example, thin-film heads or metal-in-gap heads.

Positioning actuator assemblies 180° apart makes the average latency time one quarter of a revolution, as opposed to one half of a revolution for a single actuator drive. As disk drive 20 receives a request to read data from a particular sector of a particular track, the control circuitry on PCB 36 determines which one of actuator assemblies $34_{1-2}$ will read the data based on factors including the actuator having the shorter latency time and the actuator having the shorter seek to the track.

As shown in FIGS. 3–6, each actuator assembly $34_{1-2}$ includes an actuator body 56 and ten load beams 58 which are connected to respective ones of heads 46a–j, 47a–j by flexures 60. An actuator coil 62 is mounted on actuator body sub-arms 64a–b. Each actuator body 56 is mounted on a shaft 66 by a bearing cartridge 68. Each shaft 66 is attached to base 22 and top plate 30. Actuator body 56, including all of the components attached thereto, is precisely balanced, i.e., equal amounts of weight are provided on either side of the pivot point (the center of shaft 66) so that the pivoting of actuator body 56 to position heads 46, 47 is less susceptible to linear shock and vibration.

In order to write data to and read data from the same tracks using two (or more) heads, it is necessary to closely match the skew angles of the heads. The thin film and metal-in-gap heads contemplated for use in disk drive 20 interact with disks 44 by way of a gap which is parallel with the slider body of the head. Aligning the slider body of each head with the centerline axis x (FIG. 5) of actuator body 56 provides the heads in each group of heads 46, 47 with closely matched skew angles. The tolerance for the skew angle of each head with respect to axis x is ±0.5°, and the worst case skew difference between any two heads is 1.0°. To match the skew angles of the first and second groups of heads, the rotational axis of each actuator assembly $341_{1-2}$ is located at the same radius with respect to the rotational axis of disks 44; the positioning of these rotational axes is performed with a tolerance of approximately 0.006–0.008 inches. The rigid mechanical structure provided by base 22, side wall 28, and top plate 30 maintains the precise three-dimensional alignment of actuator assemblies $34_{1-2}$ for all operating conditions.

The force for pivoting each actuator body 56 is provided by a voice coil motor including coil 62 and an actuator motor including housing 70 having top and bottom plates 70a–b, and magnets 72. Top plate 70a and bottom plate 70b are attached by spacers 70c–e. Top plate 70a is attached to base 22. Magnets 72a,b are attached to top plate 70a, and magnets 72c,d are attached to bottom plate 70b. Top and bottom plates 70a–b provide returns for the magnetic fields generated by magnets 72a–d. Magnets 70a–d are arranged to provide first and second magnetic fields $\vec{B}_1$, $\vec{B}_2$ in the air gaps between respective ones of magnets 72a and 72c and magnets 72b and 72d. First and second magnetic fields $\vec{B}_1$, $\vec{B}_2$, are encompassed in closed magnetic field loops including top and bottom plates 70a–b, magnets 72a–d, and the air gaps. By containing the magnetic fields $\vec{B}_1$ and $\vec{B}_2$ in returns the magnetic field intensity of each field is increased in the air gaps. The strength of the magnetic field in these air gaps is directly related to the torque which the voice coil motor exerts on the actuator body 56 and thus the rotational velocity of actuator body 56 and the seek times for the drive.

The motor housing 70 and actuator coil 62 are arranged so that a current in coil 62, in the presence of the magnetic fields created by magnets 70a–d creates a force which pivots actuator body 56. Currents passing in opposite directions in coil 62 create torques in opposite directions and pivot actuator body 56 to position heads 46, 47 at selected locations with respect to disks 44a–e.

To protect disks 44 from particles potentially released from magnets 72, magnet shields 73 (FIGS. 4 and 7) are provided over each pair of magnets 72a–b and 72c–d. Magnet shields 73 are formed of non magnetically permeable material, for example, plastic or stamped 300 Series stainless steel. Magnets 72 are glued to the inside of magnet shields 73 and then the exposed surface of magnets 72 is glued to the appropriate top or bottom plate 70a–b. Magnet shield 73 is then sealed to top or bottom plate 70a–b with an adhesive.

Actuator assemblies $34_{1-2}$ have individual access times of 12 msec. However, using two actuators reduces the access time by a factor approximately equal to the square root of two. Thus, the access time for disk drive 20 having two actuator assemblies $34_{1-2}$ is approximately 8.5 msec.

Read/write flex circuits $74_{1-2}$ are connected to respective headers $38_{1-2}$ and carry electrical signals from each header $38_{1-2}$ to the corresponding actuator assembly $34_{1-2}$. A spin motor flex circuit (not shown) carries electrical power from one header 38 to spin motor 32. The service loop of each read/write flex circuit $74_{1-2}$ is designed to exert only a minimal amount of rotational force (torque) on actuator body 56. Any torque exerted on actuator body 56 by any means other than the voice coil motor affects the function of actuator assembly 34 in positioning heads 46, 47 with respect to disks 44, particularly the track following and seek functions described in co-pending Applications, Ser. Nos. 057,806 and 058,289. Thus, any torques created by the voice coil motor must be controlled to compensate for the force exerted by the read/write flex circuit $74_{1-2}$.

Each read/write flex circuit $74_{1-2}$ may be separated into three portions; a first portion carrying current to actuator coil 62 and a second portion which is a ground plane separating the current carrying portion from a third data carrying portion. The data carrying portion transfers signals between heads 46, 47 and PCB 36, via header 38. The ground plane prevents interference with the relatively weak data signals which would otherwise be caused by the larger currents necessary for actuator coil 62 passing through the first portion of the read/write flex circuit $74_{1-2}$.

Figure 4:
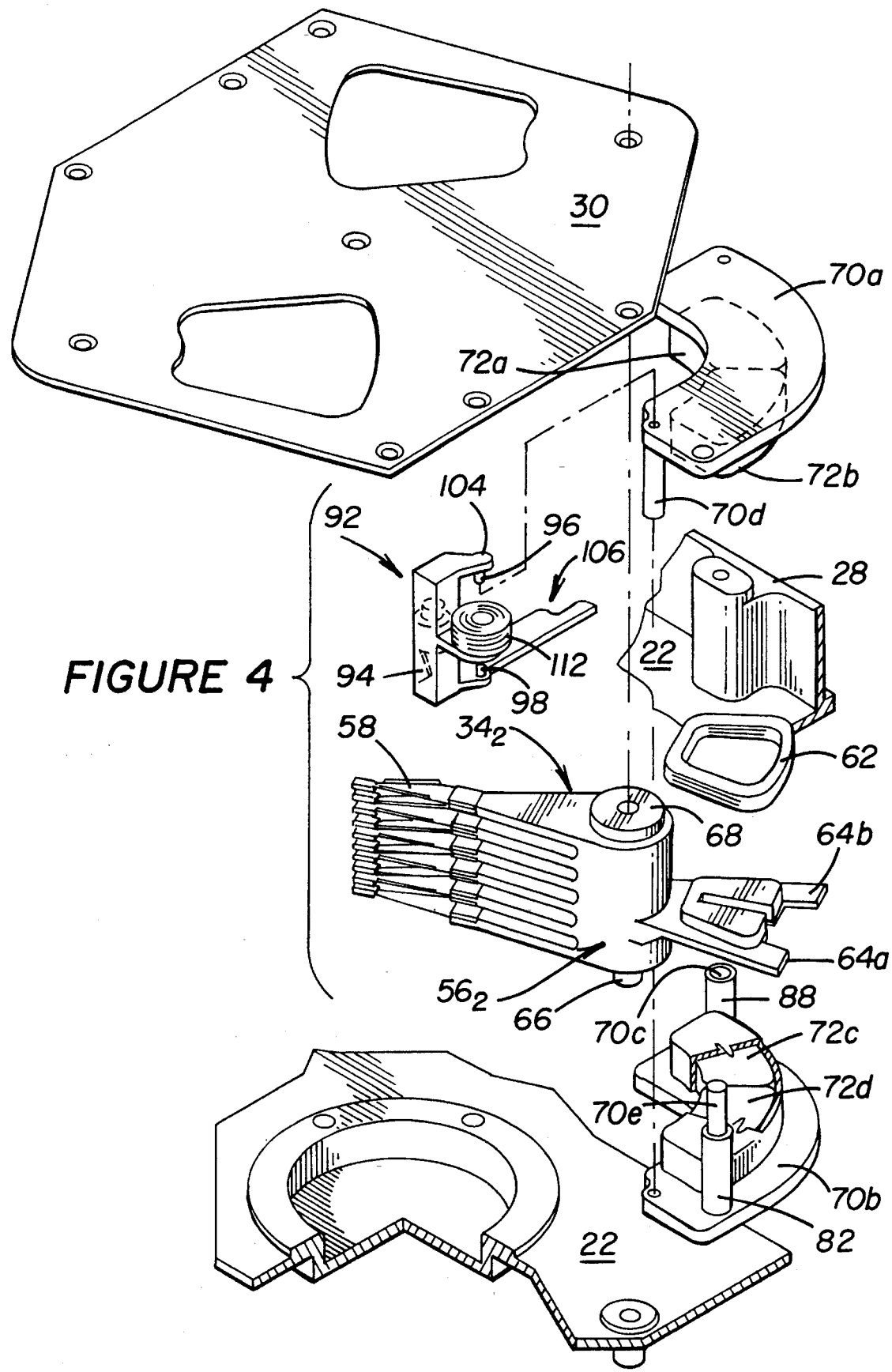
FIG. 4 is an exploded, isometric view of an actuator assembly for a multiple actuator disk drive in accordance with the present invention.
Figure 5:
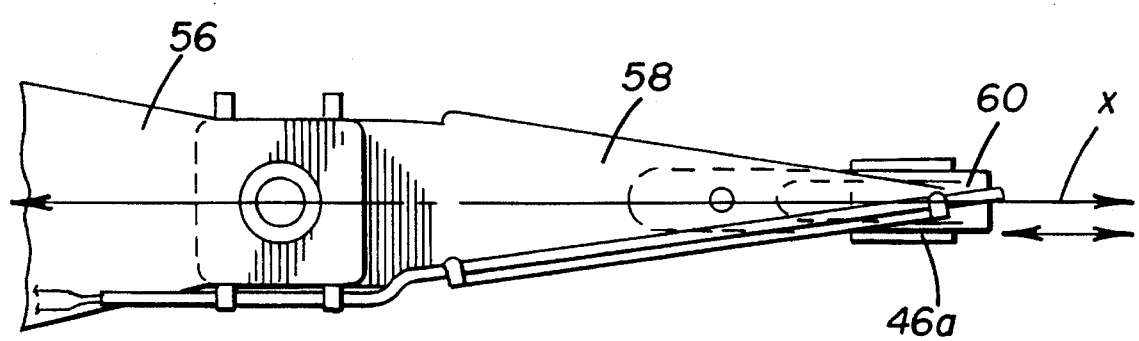
FIG. 5 is a partial, plan view of an actuator arm.
Figure 6:
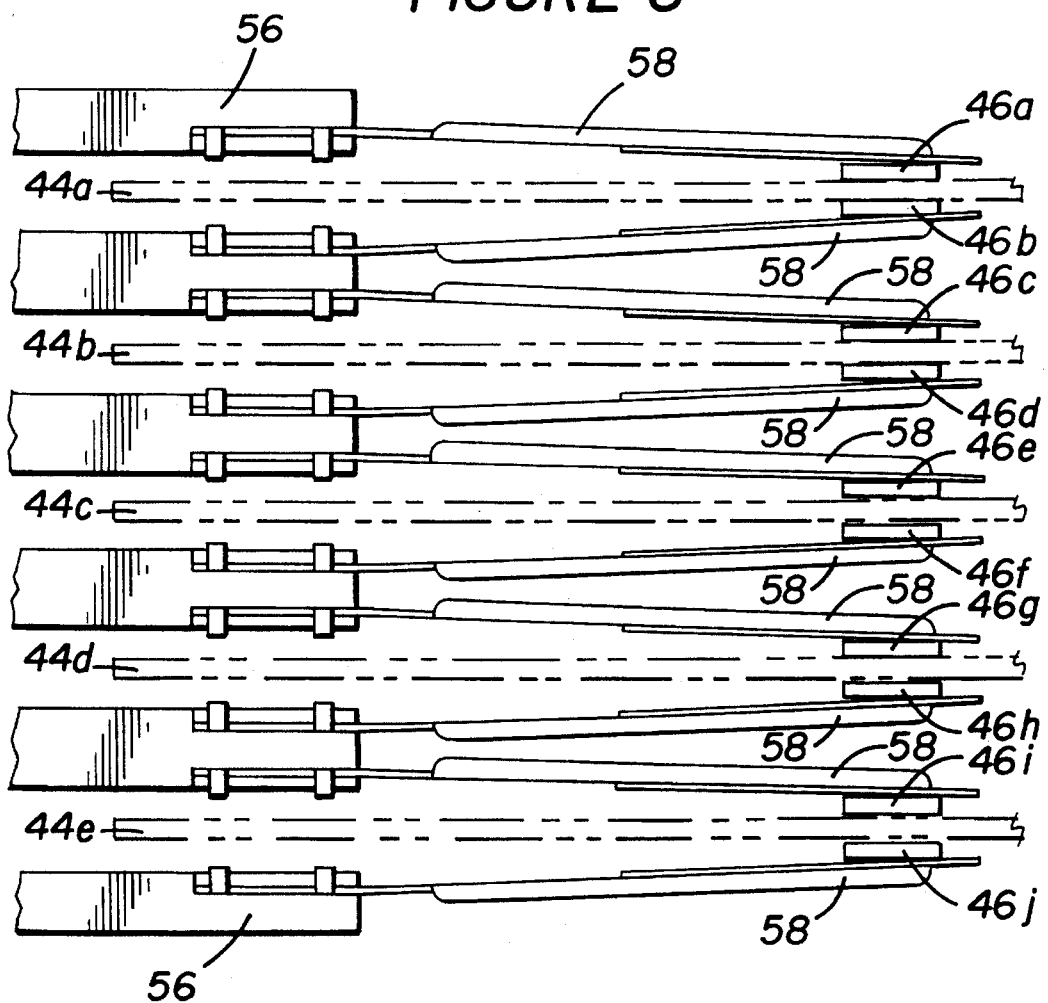
FIG. 6 is a partial, side view of a group of actuator arms.
Figure 7:
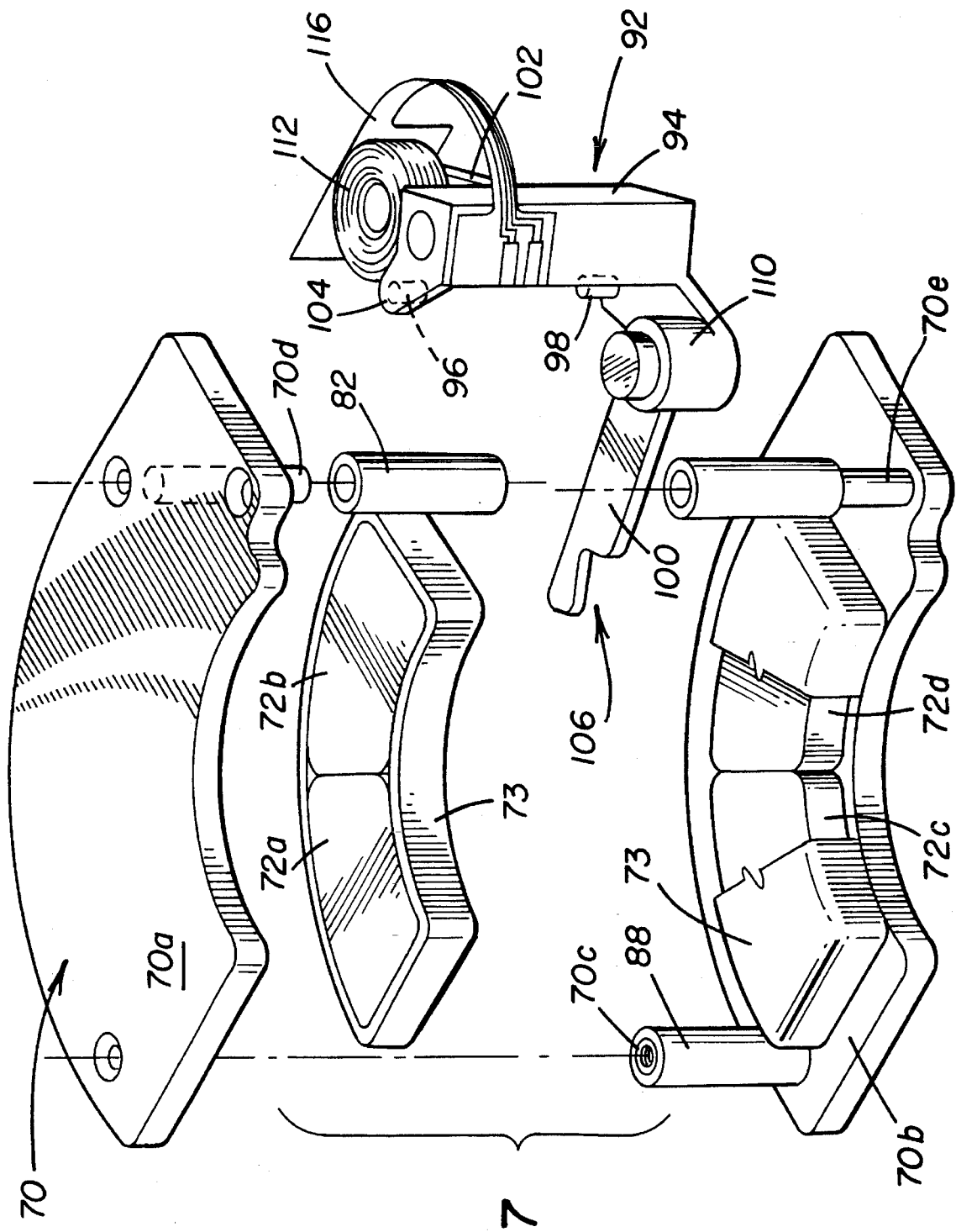
FIG. 7 is an isometric, partial cut away view of a motor housing and a latch body of a parking device for a multiple actuator disk drive in accordance with the present invention.
Figure 8:
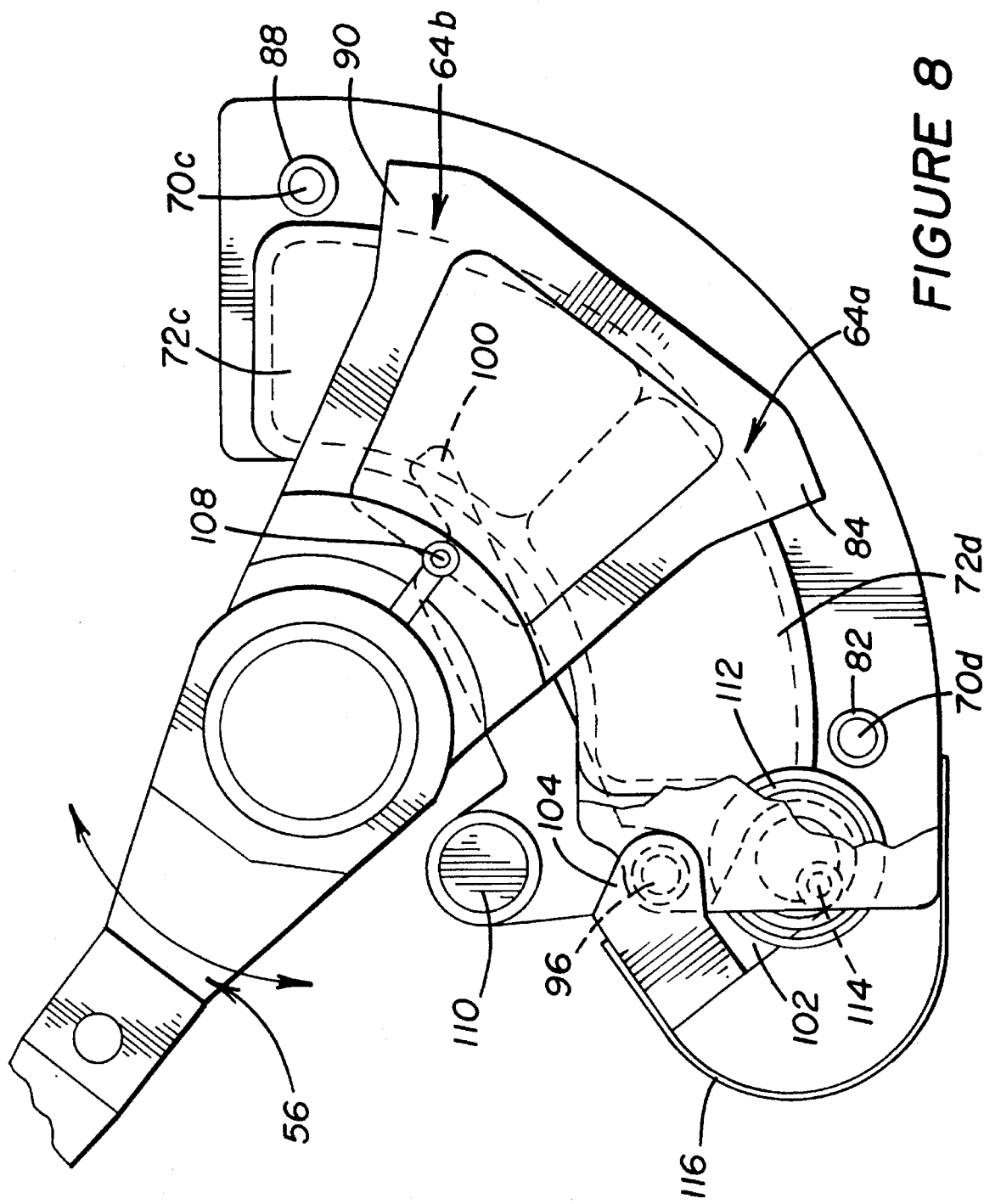
FIG. 8 is a partial plan view of the actuator motor and the parking device.

As shown in FIGS. 4, and 7, and 8, crash stops are provided to limit the pivoting movement of actuator body 56 so that heads 46, 47 travel only between the inside and outside diameters 76, 78 of disks 44. The outside diameter crash stop comprises a spacer 70d and a compliant sleeve 82 formed of, for example, rubber or plastic provided on spacer 70d. When the pivoting motion of actuator body 56 places heads 46, 47 at the outside diameter 78 of disks 44, first crash tab 84 provided on sub-arm 64a of actuator body 56 contacts compliant sleeve 82, thereby preventing movement of the heads 46, 47 beyond the outside diameter 78. Alternatively, if adjustment of the outside diameter crash stop is desired, a plastic pin which is separate from spacer 70d can be provided in a hole in bottom plate 70b. The inside diameter crash stop comprises spacer 70c and a compliant sleeve 88 provided on spacer 70c. Second crash tab 90 provided on sub-arm 64b contacts sleeve 88 to limit the movement of heads 46, 47 beyond the inside diameter 76.

A parking device 92 for parking the heads 46, 47 i.e., latching the actuator body 56 in an orientation where heads 46, 47 are positioned, for example, at the inside diameter 76 of disks 44, is provided for each actuator assembly 34hd 1–2. Parking device 92 is described in co-pending application Ser. No. 269,873; pertinent aspects of parking device 92 will be described with reference to FIGS. 7 and 8. Parking device 92 moves between a latched position, in which parking device 92 engages and latches actuator body 56, and an unlatched position, in which the parking device 92 is clear of the actuator body 56. In the preferred embodiment, parking device 92 is pivotally mounted in the disk drive to rotate between the latched and unlatched positions. However, in an alternative embodiment a parking device may be mounted to move linearly between the latched and unlatched positions using biasing and release forces provided in accordance with the present invention.

Parking device 92 includes a latch body 94, pivotally mounted, for example, by pins 96, 98 which engage motor housing 70. Three arms 100, 102, 104 extend from latch body 94. First arm 100 has a notch 106 which engages a latch pin 108 on actuator body 56 and supports a counterweight 110 which balances the latch body 94 and the various components attached thereto about its pivot points. First arm 100 also supports pin 98. Second arm 102 supports a latch coil 112 and a latch return (or latch bias) 114 which comprises a magnetically permeable element. Third arm 104 supports pin 96. Latch body 94, including all of the components attached thereto, is precisely balanced about the pivot points provided by pins 96, 98, which engage top and bottom plates 70a,b, respectively, so that the operation of parking device 92 is less susceptible to linear shock and vibration, and so that minimum amounts of force, and thus a minimum of electrical current in latch coil 112, are required to pivot the latch body 94.

A biasing force, which affects only latch body 94, is provided by the attraction of latch return to permanent magnet 72b. This biasing force rotates latch body 94 so that latch arm 100 engages latch pin 108 to park actuator body 56. Passing a current in the appropriate direction in latch coil 112, which is positioned in the magnetic field in the air gap between magnets 72b and 72d, creates a force which repels the latch coil 112 and rotates latch body 94 so that latch arm 100 swings away from latch pin 108. A latch flex circuit 116 carries current to latch coil 112 from header 38. The forces provided by latch coil 112 and latch return 114 must be adjusted to compensate for the rotational resistance (torque) created by frictional forces and latch flex circuit 116.

When power to the disk drive 20 is off, the actuator body 56 is positioned so that second crash tab 90 abuts sleeve 88 on spacer 70c and latch arm 100 engages latch pin 108. Any rotation of actuator body 56 away from pin 86 creates a torque which maintains the latch body 94 in the latched position; the moment arm of the force created by rotational movement of actuator body 56 passes on the side of the pivot provided by pins 96, 98 closest to disks 44. Accordingly, parking device 92 reliably maintains the actuator body 56 in the latched position.

The use of latch coil 112 provides a low power parking device which is highly reliable, and since the latch coil 112 is not used to attract a magnetically permeable element, there is no residual magnetism. Latch return 114 provides a reliable return force without reliance on the interactions of mechanical elements in the disk drive.

The control circuitry implemented on PCB36 will be described with reference to FIGS. 9–13. The control circuitry 170 includes a control circuit CTL for each actuator. In the preferred embodiment, first and second control circuits 180, 182 control respective ones of actuator assemblies $34_{1-2}$. Each control circuit 180, 182 includes a micro controller $18_{1-2}$, and has components which provide read/write control R/W, actuator control ACT, and spin motor control SPN. The spin control SPN on the second control circuit 182 is not utilized. Control circuits 180, 182 communicate via control and data lines 186 to coordinate the read/write operations performed by each control circuit and to enable the two control circuits 180, 182 to share a common interface 188. Interface 188 includes a third micro controller $184_3$. Data and control lines 190, 192 interconnect respective ones of control circuits 180, 182 with interface 188, and data and control lines 194 connect interface 188 to a host environment. Each control circuit 180, 182 performs closed-loop, embedded servo-tracking.

The architecture of control circuits 180, 182 and closed-loop, embedded servo tracking are described in co-pending Applications Ser. Nos. 07/057,806 (entitled DISK DRIVE SOFTWARE SYSTEM ARCHITECTURE), Ser. No. 07/386,504 (entitled DISK DRIVE SYSTEM USING MULTIPLE EMBEDDED QUADRATURE SERVO FIELDS), and U.S. Pat. No. 4,979,056 (entitled DISK DRIVE SYS- TEM CONTROLLER ARCHITECTURE) and which are incorporated by reference. Pertinent portions of the disclosures of these incorporated Applications and Patent are set forth below.

Figure 9A:
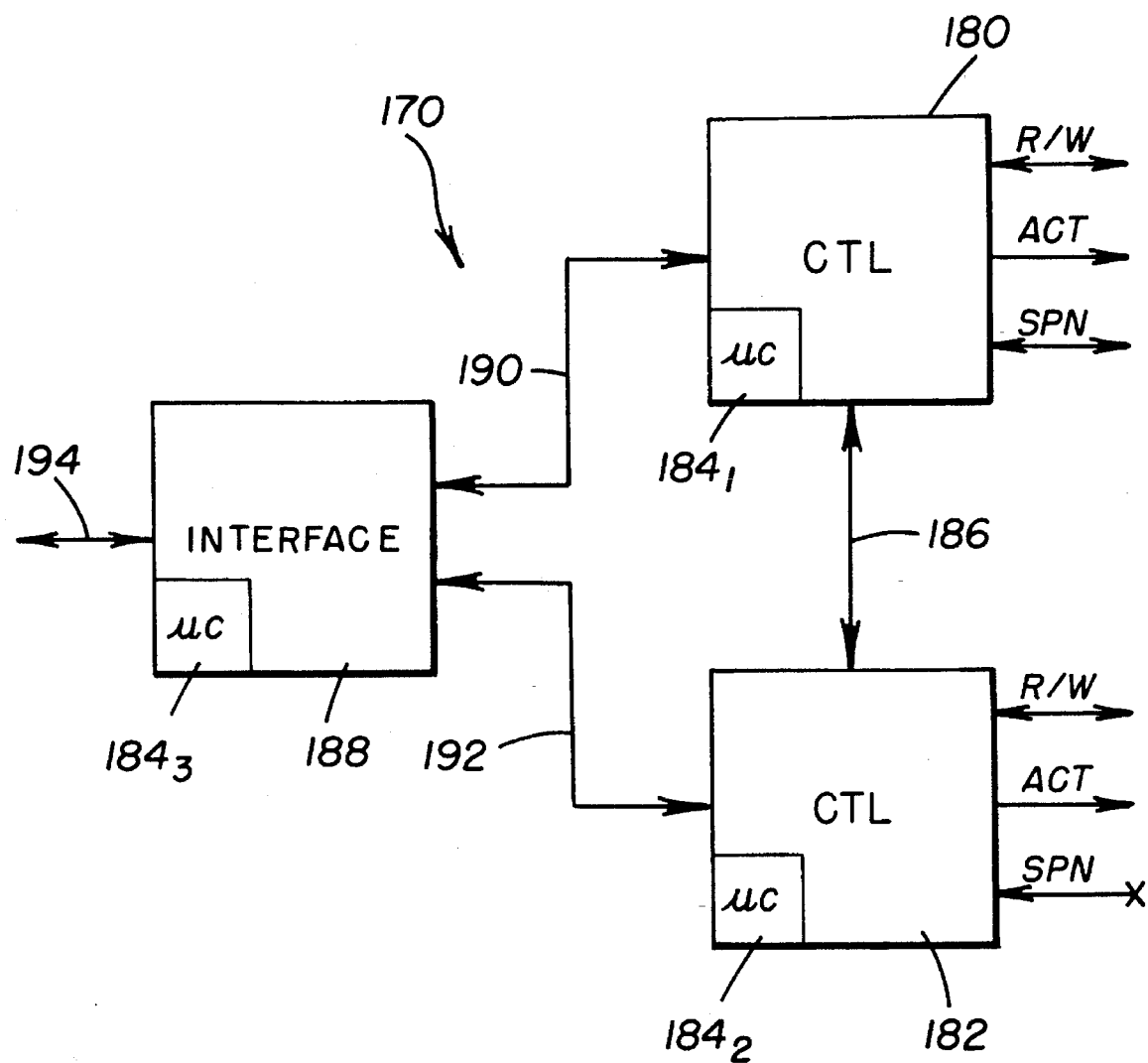
FIG. 9A is a simplified block diagram of the overall control architecture for a multiple actuator disk drive in accordance with the present invention.
Figure 9B:
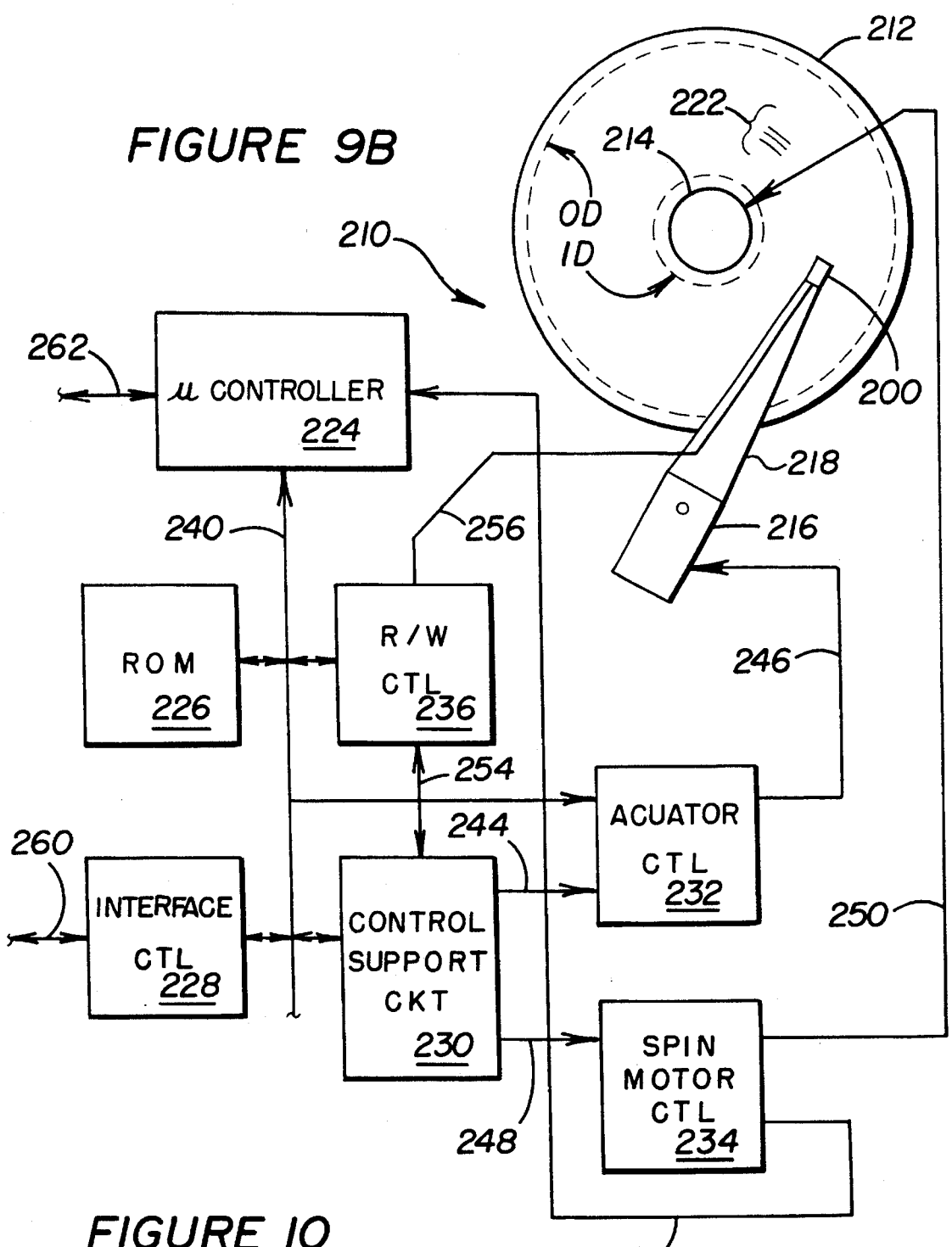
FIG. 9B is a simplified block diagram of a disk drive control system utilized with each actuator in a multiple actuator disk drive in accordance with of the present invention.

With reference to FIG. 9B, a microcontroller 224 and a minimum number of dedicated control support circuits direct the functions of disk drive 20. In the preferred embodiments of the present invention, microcontroller 224 is a four (4) megahertz clock rate Motorola MC68HC11 HCMOS single chip microcontroller, as described in the MC68HC11F1 HCMOS Single Chip Microcomputer Technical Data Book available from Motorola, Inc., Motorola Literature Distribution, P.O. Box 20912, Phoenix, Ariz., 85036.

A read-only memory (ROM) 226 is coupled to the microcontroller 224 by way of a general purpose data, address and control bus 240. The ROM 226 is utilized to store a microcontroller control program for supporting five principle tasks necessary to implement the full functionality of the disk drive 20. These tasks include interface, actuator, spin motor, read/write and monitor.

An interface control circuit 228 is provided to support the microcontroller 224 in execution of the interface task. The interface controller 228 may be a synchronous SCSI interface controller, such as the interface controller implemented as a portion of the AIC-6110, available from Adaptec, Inc., 691 South Milpitas Boulevard, Milpitas, Calif. 95025. The interface controller may also be suitable for interfacing to the IBM personal computer "AT" peripheral bus, such as interface controllers available from Cirrus Logic, Inc.

The interface controller 228, in general, provides a hardware interface between the disk drive 20 and a host computer system, typically a data processing system, via an SCSI communications bus 260. Thus, the interface controller 228 operates to manage bi-directional data streams between the communications bus 260 and the bus 240.

An actuator controller 232 is provided as an internal interface between the microcontroller 224 and actuator assembly 216. The actuator controller 232 provides for digital-to-analog conversion of a digital position control word and the current buffering of the resultant analog voltage provided on line 246 to the voice coil motor of the actuator assembly 216. The digital position control word, as provided via the bus 240 from the microcontroller 224, represents the desired actuator position. Enabling of the actuator controller 232 in general is provided via the control support circuit 230 via control lines 244. The control support circuit 230, to this end, acts as a parallel port expander for latching a control data word also provided by the microcontroller 224 via the bus 240.

A read/write controller 236 similarly acts as an internal interface between the bus 240 and the read/write heads of the actuator assembly 216 via the raw data lines 256. The read/write controller 236 functions to provide for the buffered serialization/deserialization and data clock encoding/decoding of data. Configuration and initiation of read/write controller 236 functions are performed under the direct control of the microcontroller 224 by the transfer of control and data words to the read/write controller 236 via the bus 240.

Finally, a spin motor controller 234 is provided to directly support the commutation of the spin motor 214 via the commutation current lines 250. Commutation state selection is effected by provision of a digital word from the microcontroller 224 to the control support circuit 230. This digital word is latched and provided on the commutation select lines 248 to the spin motor controller 234. A commutation current is switched by the spin motor controller 234 to a corresponding field winding phase pair of the spin motor 214 via the commutation current lines 250. A voltage proportional to the current conducted through the selected field winding phase pair of the spin motor 214 is provided via the feedback line 252 to an analog-to-digital converter input of the microcontroller 224.

Tables 1 and 2 below specify certain characteristics of disk 212.

TABLE 1

| | |
|---|---|
| Number of Disks | 5 |
| Number of Data Surfaces | 10 |
| Number Data Cylinders (Tracks per surface) | 1935 cylinders |
| Sectors per Track | 52 sectors |
| Bytes per Sector | 662 bytes |
| Data Bytes per Sector | 512 bytes |
| Data Capacity per Data Surface (formatted) | 50 Mbytes |
| Total Data Capacity (formatted) | 500 Mbytes |

TABLE 2

| | |
|---|---|
| Disk Diameter | 95 millimeters |
| | 3.74 inches |
| Data Track Band Width | 20.32 millimeters |
| | 0.8 inches |
| Track Density | 2347 tracks/inch |
| Bit Density (max) | 29–30K fci |
| Head Width | 7.5 microns |
| Track Width | 10.8 microns |

The high track density utilized in the preferred embodiment, i.e., approximately 2300–2400 tpi, is made possible, in part, by the low flying height of heads 46, 47. The heads 46, 47 fly at 5 micro-inches which allows the bit density of disks 44 to be at least as high as 29,000 fci. The increased bit density reduces the size (in degrees) of each sector, thereby providing more sectors and more servo bursts per track. Tighter track following is provided by the more frequent servo bursts. Using a fixed, standard disk rotational speed of 3600 rpm, a larger number of sectors per track increases the data transfer rate. In the disk drive of the present invention, each head heads bits at a rate of 16 $MH_z$. For two heads 32 Mbits per second or 4 Mbytes per second are read. Thus, the maximum data transfer rate is approximately 4 Mbytes/sec.

Figure 10:
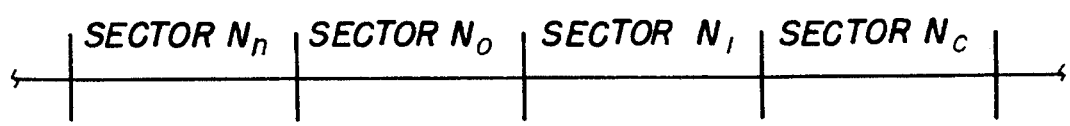
FIG. 10 is a simplified representation of a portion of data track with a plurality of sectors provided thereon.
Figures 11A, 11B, 12, 13:
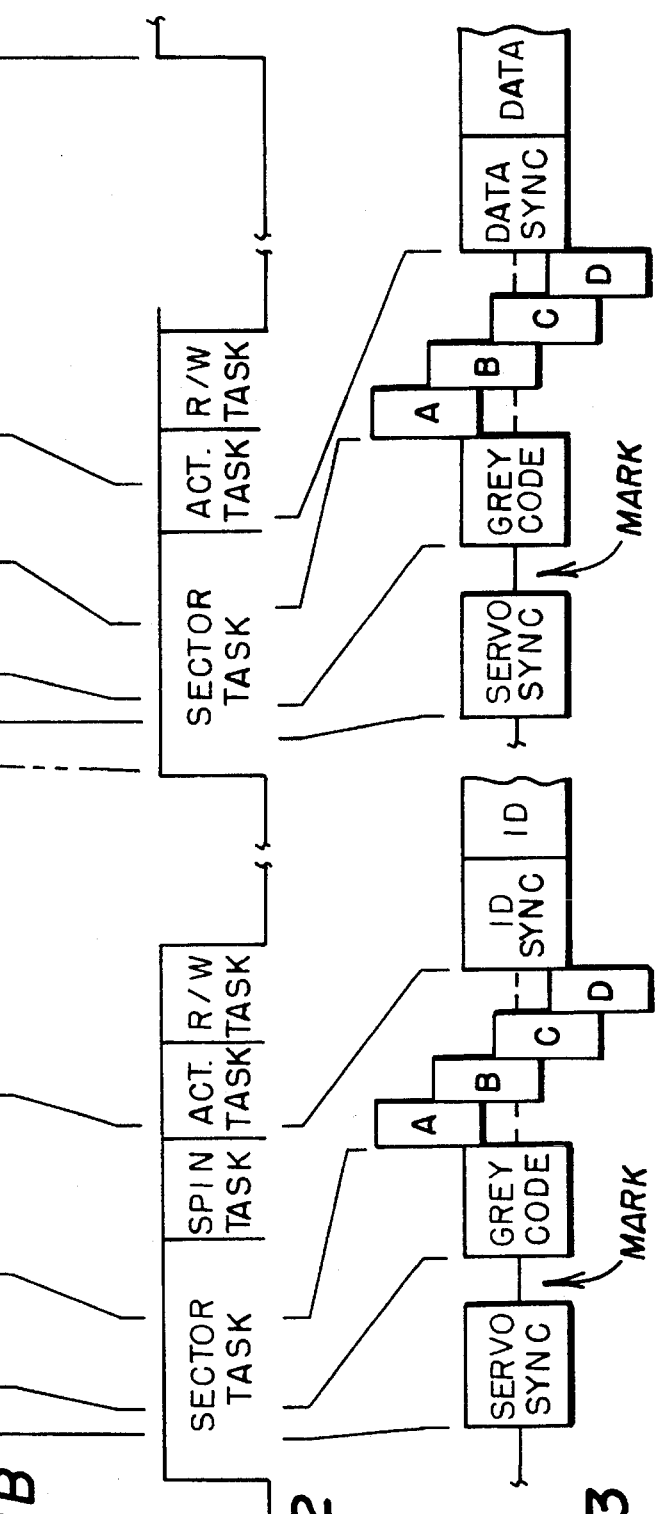
FIGS. 11A–B illustrate the distribution of servocontrol information and data in a simple, exemplary sector.
FIG. 12 illustrates the task management control system flow structure in processing the servo-control information of the sector shown in FIGS. 11A–B.
FIG. 13 illustrates the detailed presentation of the servo control information of the exemplary sectors shown in FIGS. 11A–B.

As generally represented in FIG. 10, each track of the concentric data tracks 222 provided on the surface of a disk 212 are further subdivided into sectors $N_{0-n}$. In accordance with the present invention, and as generally shown in FIG. 11A, each sector is composed of a servo 1 field, a data 1 field, first error correction code (ECC) field, mid-sector gap field, servo 2 field, data 2 field, second ECC field, and final gap field. As shown in FIG. 11B, the servo 1 field is further composed of a servo mark field, gray code field, servo burst field, ID sync field, ID field, and data sync field. Similarly, the servo 2 field is composed of a second sector mark field, second gray code field, and servo burst field and finally, a data sync field. The order and size of these fields are set forth in Table 3.

TABLE 3

| Half Sector "A" Field | Bytes | Half Sector "B" Field | Bytes |
|---|---|---|---|
| Servo Sync | 3 | Servo Sync | 3 |
| Gray Code | 8 | Gray Code | 8 |
| Servo Burst A | 4 | Servo Burst A | 4 |
| Servo Burst B | 4 | Servo Burst B | 4 |
| Servo Burst C | 4 | Servo Burst C | 4 |
| Servo Burst D | 4 | Servo Burst D | 4 |
| Pad | 1 | Pad | 1 |
| ID Sync | 12 | Data Sync | 12 |
| ID (Header) | 4 | Data | 267 |
| ID CRC | 2 | ECC | 7 |
| Pad | 4 | Gap | 17 |
| Data Sync | 12 | 662 Bytes Total | |
| Data | 245 | | |
| ECC | 7 | | |
| Gap | 17 | | |
| 331 Bytes (1st half) | | | |

The sector mark fields are provided to synchronize the microcontroller with the control information present in the remaining portions of the servo 1 and 2 fields as well as the data 1 and 2 fields. The gray code fields provide an unambiguously encoded track number. The unambiguous coding of the gray code values is further qualified in that the gray code values like sectors on adjacent tracks differ by a single bit and that no more than two consecutive zero bits are allowed in a valid gray code value.

The servo burst fields, in accordance with the preferred embodiments of the present invention, are sequentially arranged burst fields of constant amplitude and constant frequency offset in a pre-defined pattern from the center line of the data sector.

The ID sync field of the servo 1 field is also written at constant frequency and voltage, though centered on the track center line. The ID sync field allows the read/write controller to distinguish the first bit of the ID field. The ID field is used to store the cylinder, sector and head numbers.

Finally, the data sync fields are constant frequency and amplitude fields provided to define the first bits of the respective data fields 1 and 2. The read/write controller synchronizes to the frequency of the data sync field. The first discontinuity in the sync frequency is therefore taken as the first data representative transition.

Referring now to FIG. 12, task execution as performed by the microcontroller 224 is shown mapped against the real time occurrence of the servo 1 and 2 fields with respect to a read/write head 220.

Specifically, a sector task is initiated in response to a countdown timer interrupt just prior to the occurrence of the servo 1 field. From this interrupt, the microcontroller 224 enables the control support circuit 230 to detect and process the sector mark field. A control value is then provided to the spin motor controller 234 to commutate the spin motor 214.

As shown in FIG. 13, the sector mark field itself is composed of a servo sync field followed by the sector mark. The servo sync field is another constant amplitude and constant frequency field. The sector mark is defined as the first read data transition following the absence of any servo sync transitions for at least three servo sync clock cycles. The time of occurrence of the sector mark is recorded by a hardware timer within the microcontroller 224 for use in subsequent tasks as well as scheduling the countdown timer interrupt necessary for processing the servo 2 field.

Figure 14:
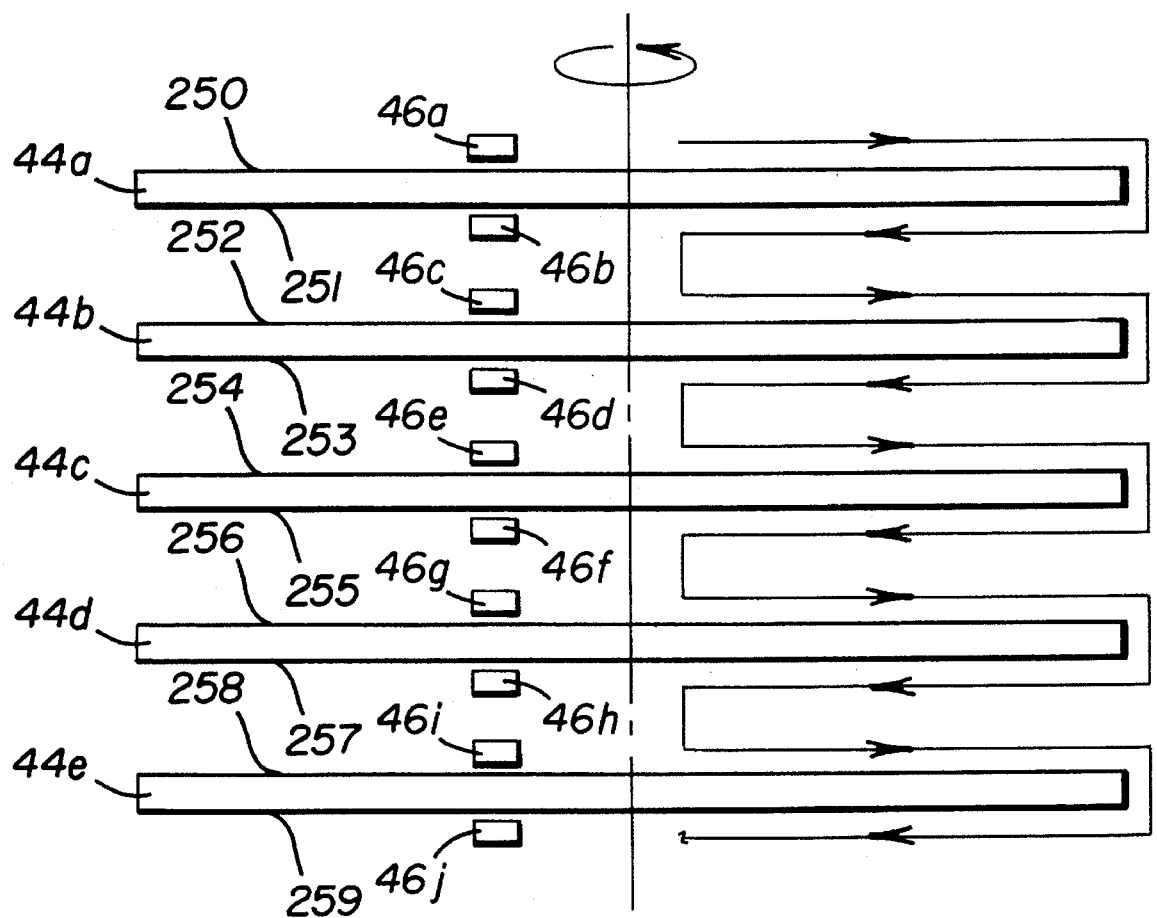
FIG. 14 is a cross sectional view of a stack of disks for useful in explaining the horizontal data structure employed in a multiple actuator disk drive in accordance with the present invention.

The horizontal data structure utilized in the preferred embodiment of multiple actuator disk drive 20 will be described with reference to FIG. 14. Each disk 44a–e has two data surfaces. The ten data surfaces are identified as surfaces 250–259. Each group of heads 46, 47 interact with corresponding, respective ones of data surfaces 250–259; only heads 46a–j are shown in FIG. 14. As data is recorded on disks 44a-e, the data tracks on the first data surface 250 are filled, and then all of the data tracks on data surface 251 are filled, and so on for each of the successive surfaces 251–259. As the last track at the outer diameter of data surface 250 is filled with data by head 46a, a head switch is performed and head 46b begins recording data at the outside diameter of disk surface 251, filling the tracks sequentially toward the inner diameter of data surface 251. This serpentine flow of data prevents a seek from the outside diameter to the inside diameter or from the inside diameter to the outside diameter upon switching from one data surface to the next.

The mechanical misalignment which may occur between the two groups of heads 46, 47 could cause one group of heads to be out of alignment with cylinders defined by the other group of heads. Thus, the head switch could require a seek of one or more tracks to place the newly selected head over the desired track. With the horizontal data structure first and second groups of heads 46, 47 are able to efficiently read the same data without experiencing read errors which could be caused by the slightly different alignment of the two groups of heads. With the 12 msec access time of actuators $34_{1-2}$ a track-to-track seek, performed with a precisely defined algorithm, is, on the average, as fast or faster than a head switch.

We claim:

1. A disk drive, comprising:

a housing including a base and a first cover defining a first controlled environment isolated from ambient atmospheric pressures;

storage means for storing data;

means for supporting said storage means in said first controlled environment and for rotating said storage means;

interactive means for reading information from and writing information on said storage means;

actuator means, supported on said base in said first controlled environment and responsive to control signals, for selectively positioning said interactive means with respect to said storage means, said actuator means including a voice coil motor having a magnet, coupled to a magnet support structure, and an actuator coil;

control means for generating control signals to control said actuator means and for providing information signals to and receiving information signals from said interactive means; and a second cover provided within the first controlled environment and coupled to said magnet support structure to define a second controlled environment within said first controlled environment to prevent contaminant material generated by decomposition of the magnet over time from entering said first controlled environment.

2. The disk drive of claim 1 wherein said second cover is formed of a non-magnetically permeable material.

3. The disk drive of claim 2 wherein said magnet has a shape including at least a first and second major sides, and wherein said second cover conforms to said shape of said magnet and is adhesively secured to said magnet support structure.

4. The disk drive of claim 3 wherein said second cover is formed of stainless steel.

5. The disk drive of claim 3 wherein said second cover is comprised of plastic.

6. A disk drive including a housing having a base, and a first cover, the base and first cover defining a first controlled environment when engaged, comprising:

a data storage medium supported by the base and within the controlled environment;

transducer means for reading information from and writing information to said data storage medium;

actuator means, supported by the base within the controlled environment, for selectively positioning said transducer means with respect to said data storage medium, including an actuator arm pivotally mounted on the base having a first end for supporting said transducer means and a second end, a magnet for providing a magnetic field, a motor housing for supporting said magnet and for providing a return for the magnetic field, and an actuator coil provided on the second end of said actuator arm arranged so that a current in said actuator coil in the presence of the magnetic field provided by said magnet, creates a force to pivot said actuator arm;

a magnet shield structure comprising a second cover coupled to said motor housing, defining a second controlled environment about the magnet, the magnet shield structure encasing said magnet between the housing and the shield structure to prevent contaminant material generated by decomposition of the magnet over time from entering said first controlled environment; and parking means for selectively parking said actuator arm and said transducer means.

7. The disk drive of claim 6 wherein said magnet shield structure is manufactured of non-magnetically permeable material.

8. The disk drive of claim 7 wherein said magnet shield structure is formed of plastic.

9. The disk drive of claim 7 wherein said magnet shield structure is formed of stainless steel.

10. An apparatus for a disk drive having a housing comprising a first cover coupled to a base defining a first controlled environment isolated from ambient atmospheric conditions and pressures, the disk drive including a data storage medium, a transducer for reading information from and writing information to the data storage medium, and an actuator for selectively positioning the transducer with respect to the data storage medium, all included within said first controlled environment, the actuator including a magnet coupled to a magnet support structure, for providing a magnetic field and a voice coil assembly mounted on the actuator, comprising a magnet shield cover coupled to said magnet support structure and defining a second controlled environment, isolated within said first controlled environment, encasing said magnet.

* * * * *